United States Patent
Harris et al.

(10) Patent No.: US 12,522,035 B2
(45) Date of Patent: Jan. 13, 2026

(54) COLLAPSIBLE TOW HOOK WITH STOWING

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 450 days.

(21) Appl. No.: 18/121,540

(22) Filed: Mar. 14, 2023

(65) Prior Publication Data
US 2024/0308284 A1    Sep. 19, 2024

(51) Int. Cl.
*B60D 1/54* (2006.01)
*B60D 1/04* (2006.01)

(52) U.S. Cl.
CPC ...... *B60D 1/54* (2013.01); *B60D 1/04* (2013.01)

(58) Field of Classification Search
CPC . B60D 1/04; B60D 1/54; B60D 1/544; B60D 1/56; B60D 1/565; B60D 1/243; B60D 1/244; B60D 1/187; B60D 1/42; B60D 1/48; B60D 1/1675
USPC ............. 280/491.1, 491.2, 491.3, 486, 480.1
See application file for complete search history.

(56) References Cited

U.S. PATENT DOCUMENTS

| 448,304 A | * | 3/1891 | Shuttleworth |
| 1,991,684 A | * | 2/1935 | Ketel ...................... B60D 1/50 267/71 |
| 3,667,418 A | * | 6/1972 | Janssen ................... B63B 21/56 280/486 |
| 5,088,754 A | | 2/1992 | Skelton et al. |

(Continued)

FOREIGN PATENT DOCUMENTS

| CN | 2449976 Y | * | 9/2001 |
| CN | 202368279 U | * | 8/2012 |

(Continued)

OTHER PUBLICATIONS

CN2449976, English translation. (Year: 2001).*
(Continued)

*Primary Examiner* — Anne Marie M Boehler
(74) *Attorney, Agent, or Firm* — Snell & Wilmer LLP

(57) ABSTRACT

Methods, systems, and apparatus for a tow hook assembly for a vehicle. The tow hook assembly includes a tow hook having a distal end and a proximal end opposite the distal end, a translating member configured to be coupled to the tow hook, a hinge disposed between the tow hook and the translating member, a housing configured to house at least a portion of the translating member, and a biasing member disposed within the housing and configured to be coupled to the translating member such that the biasing member is configured to deploy the tow hook. A horizontal axis extending between the proximal end and the distal end. The translating member is configured to translate the tow hook along the horizontal axis, and the hinge is configured to rotate the tow hook about the hinge and radially away from the horizontal axis.

17 Claims, 3 Drawing Sheets

(56) References Cited

U.S. PATENT DOCUMENTS

| | | | | |
|---|---|---|---|---|
| 7,011,329 | B2* | 3/2006 | Yoder | B60D 1/143 |
| | | | | 280/493 |
| 10,464,382 | B2 | 11/2019 | Ghannam et al. | |
| 11,059,336 | B1* | 7/2021 | Perry | B60D 1/54 |
| 2010/0213687 | A1* | 8/2010 | Mcdaniel | B60D 1/40 |
| | | | | 280/491.2 |
| 2018/0208006 | A1* | 7/2018 | Farooq | B60D 1/565 |
| 2024/0157741 | A1* | 5/2024 | Hammer | B60D 1/48 |
| 2024/0308282 | A1* | 9/2024 | Harris | B60D 1/246 |

FOREIGN PATENT DOCUMENTS

| | | | | |
|---|---|---|---|---|
| CN | 114083943 A | * | 2/2022 | ............... B60D 1/54 |
| CN | 114802538 A | * | 7/2022 | ........... B60G 13/005 |
| DE | 102006009675 A1 | | 9/2007 | |
| EP | 2623345 A1 | | 8/2013 | |
| EP | 3415398 A1 | | 12/2018 | |
| EP | 3708391 A1 | | 9/2020 | |
| KR | 20050060392 A | * | 6/2005 | ............... B60D 1/54 |

OTHER PUBLICATIONS

KR20050060392, English Translation. (Year: 2005).*
Polestar, "Folding towbar", https://www.polestar.com/en-ca/manual/polestar-2/2021/article/Folding-towbar*/, Apr. 19, 2022, 9 pages.

* cited by examiner

COLLAPSIBLE TOW HOOK WITH STOWING

BACKGROUND

Field

This disclosure relates to stowing and deployment of tow hooks on a vehicle.

Description of the Related Art

Recovery hooks or tow hooks are common on many vehicles including trucks. These are commonly used to recover vehicles that become stuck while off-roading or in heavy snow or mud. These hooks often protrude from the front bumper of the vehicle for ease of attaching recover straps. These tow hooks however negatively affect the crash performance of the vehicle (small overlap, frontal crash, angled rigid barrier, pedestrian impact, etc.).

Accordingly, there is a need for a system providing a tow hook that is functional for recovery, which does not negatively impact the vehicle performance during a collision.

SUMMARY

In general, one aspect of the subject matter described in this disclosure may be embodied in a tow hook assembly for a vehicle. The tow hook assembly includes a tow hook having a distal end and a proximal end opposite the distal end, a translating member configured to be coupled to the tow hook, a hinge disposed between the tow hook and the translating member, a housing configured to house at least a portion of the translating member, and a biasing member disposed within the housing and configured to be coupled to the translating member such that the biasing member is configured to deploy the tow hook. A horizontal axis extending between the proximal end and the distal end. The translating member is configured to translate the tow hook along the horizontal axis, and the hinge is configured to rotate the tow hook about the hinge and radially away from the horizonal axis.

In another aspect, the subject matter may be embodied in a method for operating the tow hook assembly of a vehicle. The method includes providing the tow hook assembly in a deployed position, applying an external force to a tow hook of the tow hook assembly to move the tow hook along a horizontal axis, and rotating the tow hook from the deployed position to a stowed position.

The method includes determining, by a processor, to activate a tow hook assembly in response to a sensor detecting a collision of the vehicle, actuating, by the processor, a pneumatic actuator of the tow hook assembly in response to the collision detection, and stowing, via the pneumatic actuator, a tow hook coupled to the pneumatic actuator.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for stowing and deploying a tow hook on a vehicle that is functional, while eliminating any negative impact on the vehicle performance during a collision and/or during a greater speed (e.g., 25 mph). Particular embodiments of the subject matter described in this disclosure may be implemented to realize one or more of the following advantages. A tow hook assembly may include a tow hook that can deploy and stow in response to a force applied by a driver or a user.

For instance, the tow hook system may include a spring-actuated assembly responsive to manual deployment and stowing. A collapsible tow hook may include a horizontal translating member that is connected to the tow hook via a hinge. In a towing position, an angle of the tow hook is maintained by a pin in contact with a front bumper bracket. Further, a horizontal position of the tow hook is maintained by a horizontal spring which applies a biasing force on the horizontal translating member such that the position of the tow hook is fixed in place when the vehicle needs to be towed. To collapse the tow hook, a horizontal force is applied onto the tow hook in a direction opposite the towing direction, thereby compressing the horizontal spring connected to the horizontal translation portion. Once the tow hook has been pushed by a certain amount, the pin may move past the front bumper bracket. This results in the tow hook rotating downwards, relative to the horizontal translating member, due to a preloaded position of the torsion spring. The rotation of the tow hook prevents the tow hook from interfering during a vehicle crash.

Figure 1:
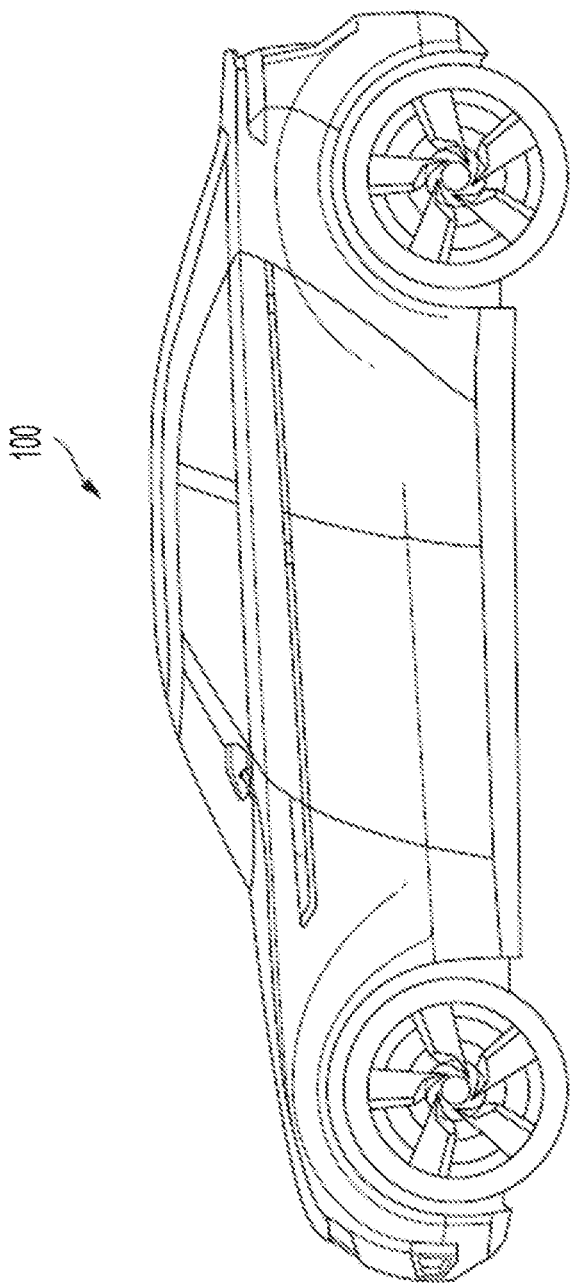
FIG. 1 illustrates a vehicle according to an aspect of the invention.

FIG. 1 illustrates a vehicle 100 to be used with a tow hook assembly, as described herein, according to an example embodiment. A vehicle 100 is a conveyance capable of transporting a person, an object, or a permanently or temporarily affixed apparatus. The vehicle 100 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 100 may be self-maneuvering and navigate without human input. An autonomous vehicle may have and use one or more sensors and/or a navigation unit to drive autonomously.

Figure 2:
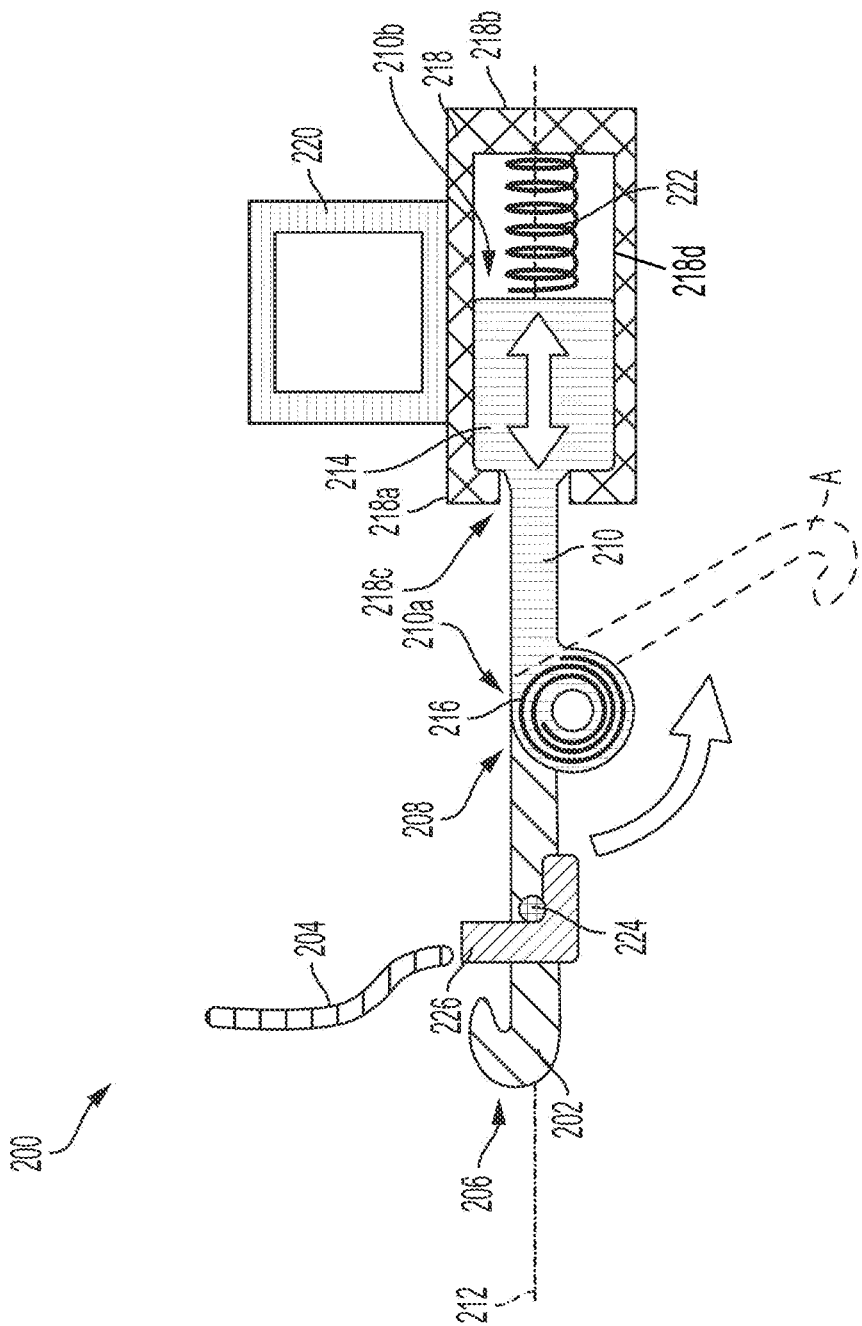
FIG. 2 is a schematic diagram of a tow hook assembly according to an aspect of the invention.

In various embodiments, the vehicle 100 may be configured to tow (e.g., be configured as a towing vehicle) another vehicle, trailer, etc. (e.g., a towed vehicle). A tow hook (e.g., tow hook 202 as shown in FIG. 2) may be used to secure and attach the towing vehicle to the towed vehicle. The towing vehicle may have a bumper and/or a connector that is used to connect the towing vehicle to a towing rod or bar, which is connected to a bumper and/or a connector of the towed vehicle. In various embodiments, the towed vehicle may be a boat, a flatbed trailer (with or without another vehicle stowed thereon), a box trailer, etc. In various aspects, the towing vehicle may be a motorhome or a recreational vehicle (RV), for example, configured to tow a towed vehicle (e.g., a sports utility vehicle (SUV)) where the towed vehicle is being flat towed (i.e., all wheels are on the ground).

FIG. 2 illustrates a tow hook assembly 200 for use with the vehicle 100 described herein. The tow hook assembly 200 includes a tow hook 202. The tow hook 202 may be a carabiner hook, a rope hook or other fastening, coupling, connecting or anchoring device that fastens, couples or connects to the towed object, such as a tow hitch of the towed object. For instance, the tow hook 202 may be fastened, coupled or otherwise secured to a tow rope. The tow hook 202 is configured to secure the towed object and allows the towed object to be pulled, moved or otherwise towed by the vehicle 100. The tow hook 202 may extend past a bumper panel 204 such that the tow hook 202 is easily accessed by a user. The tow hook 202 may have a distal end 206 and a proximal end 208 opposite the distal end 206.

The tow hook assembly 200 includes a translating member 210. The translating member 210 may have a first end 210a and a second end 210b. The translating member 210 may be configured to couple (e.g., attach, connect, secure, etc.) to the tow hook 202. Particularly, the first end 210a of the translating member 210 may be configured to couple to the proximal end 208 of the took hook 202. The translating member 210 may be configured to facilitate movement of the tow hook 202. For instance, the translating member 210 may be configured to translate the tow hook 202 horizontally along a horizontal axis 212. In other words, the translating member 210 is configured to move the tow hook 202 proximally and distally, with reference to the proximal end 208 and the distal end 206 of the tow hook 202. Further, the translating member 210 may have an anchor 214. The anchor 214 may be disposed on the second end 210b of the translating member 210. The anchor 214 may be configured to secure the translating member 210 within the tow hook assembly 200, as will be described herein.

The tow hook assembly 200 may include a hinge 216 (e.g., a torsion spring). The tow hook 202 and the translating member 210 may be coupled via the hinge 216. For instance, the hinge 216 may be disposed between the first end 210a of the translating member 210 and the proximal end 208 of the took hook 202. The hinge 216 may be configured to facilitate rotational movement of the tow hook relative to the translating member 210. In other words, the tow hook 202 may be configured to rotate about the hinge 216 and radially away from the horizonal axis 212.

The tow hook assembly 200 includes a housing 218. The housing 218 may be coupled to a frame 220, or a bumper reinforcement, of the vehicle 100. The housing 218 may have a first end 218a and a second end 218b opposite the first end 218a. The housing 218 may be configured to house various components of the tow hook assembly 200, as described herein, including at least a portion of the translating member 210. For instance, the anchor 214 of the translating member 210 may be disposed within the housing 218. The housing 218 may include an opening 218c on the first end 218a configured to allow the translating member 210 to move proximally (e.g., in the direction of the second end 218b of the housing 218) and/or distally (e.g., in the direction of the first end 218a of the housing 218) along the horizontal axis 212, thus moving the tow hook 202 along the horizontal axis 212. The anchor 214 may be configured to prevent the translating member 210 from being completely removed from the housing 218 when the tow hook 202 is moved distally. For instance, the anchor 214 is configured to be in confronting relation with an inside surface 218d of the housing 218 adjacent the opening 218c when the tow hook 202 is in a deployed position.

The tow hook assembly 200 includes a biasing member 222 (e.g., a spring). The biasing member 222 may be configured to apply a biasing force onto the translating member 210 in the direction of the horizontal axis 212. For instance, the biasing member 222 may be disposed within the housing 218 between the anchor 214 and the second end 218b of the housing 218. The biasing member 222 maintains the tow hook 202 in the deployed position. For instance, the biasing member 222 applies a biasing force on the translating member 210 and the tow hook 202 in the distal direction past the bumper panel 204 such that the position of the tow hook 202 is fixed in place when the vehicle 100 needs to be towed. Further, the flexibility of the biasing member 222 allows movement of the tow hook 202 along the horizontal axis 212.

The tow hook assembly 200 includes a pin 224. The pin 224 may be configured to maintain the tow hook 202 in the deployed position (e.g., a towing position). For instance, the pin 224 may be configured to be in confronting relation with a bumper bracket 226. To collapse the tow hook 202 from the deployed position to a stowed position (e.g., position A), a horizontal force may be applied onto the tow hook 202 (e.g., by a user) in the proximal direction, thereby compressing the biasing member 222 connected to the translating member 210. Once the tow hook 202 is pushed in by a threshold amount, the pin 224 may move past the front bumper bracket 226. Accordingly, the tow hook 202 is free to rotate downwards relative to the translating member 210 (e.g., about the hinge 216) due to a preloaded position of the hinge 216. The rotation of the tow hook 202 prevents the tow hook 202 from interfering during a vehicle crash. Accordingly, the tow hook 202 may be visible and accessible past the bumper panel 204 but will not negatively affect the deformation mode or performance during a crash event.

In various embodiments, the tow hook assembly 200 may include a lock. For instance, the lock may be configured to lock the tow hook 202 to prevent the horizontal movement of the tow hook 202 only while towing or during recovery in order to prevent unintended pushing and stowing of the tow hook 202. For instance, the tow hook 202 may be locked to the bumper bracket 226 via a locking mechanism (e.g., a pin). This may prevent unintentionally pushing the tow hook 202 and stowing the tow hook 202 when the vehicle 100 is being towed.

Figure 3:
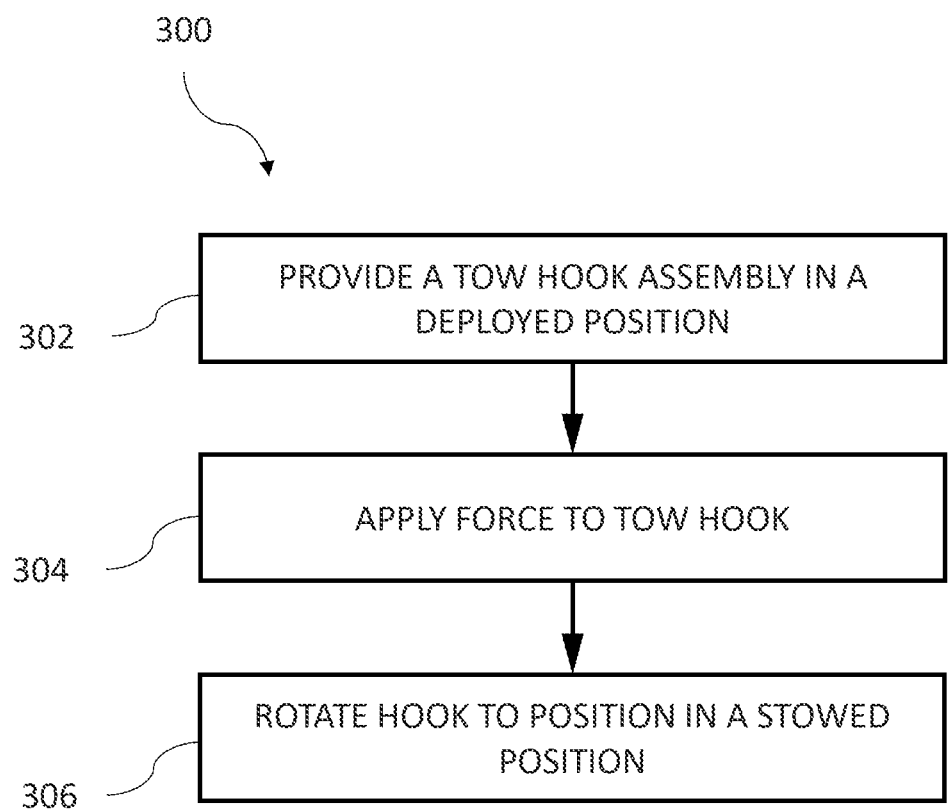
FIG. 3 is a flow diagram of an example process for using the tow hook assembly of FIG. 2 according to an aspect of the invention.

FIG. 3 is a flow diagram of an example process 300 for operating the tow hook assembly 200. At 302, a tow hook assembly (e.g., tow hook assembly 200) is provided in a stowed position. For instance, a biasing force by the biasing member 222 may be applied to the tow hook 202 via the translating member 210 such that the tow hook 202 extends past the bumper panel 204. The tow hook 202 may be secured in the deployed position by the anchor 214 within the housing 218 and/or the pin 224 in confronting relation with the bumper bracket 226.

At 304, an external force opposite the biasing force by the biasing member 222 may be applied to the tow hook 202 to move the tow hook 202 from the deployed position to a stowed position. Accordingly, the tow hook 202 and the translating member 210 shift along the horizontal axis 212, thus compressing the biasing member 222.

At 306, the tow hook 202 may rotate about the hinge 216 once the tow hook 202 is pushed proximally enough such that the pin 224 clears the bumper bracket 226. Due to the preloaded position of the hinge 216 (e.g., torsion spring), the tow hook 202 rotates downward relative to the translating member 210. The driver or the user may pull the tow hook 202 manually back to the deployed position as desired.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A tow hook assembly for a vehicle, comprising:
   a tow hook having a distal end and a proximal end opposite the distal end, a horizontal axis extending between the proximal end and the distal end;
   a translating member configured to be coupled to the tow hook, the translating member configured to translate the tow hook along the horizontal axis;
   a hinge disposed between the tow hook and the translating member, the hinge configured to rotate the tow hook about the hinge and radially away from the horizontal axis;
   a housing configured to house at least a portion of the translating member;
   a biasing member disposed within the housing and configured to be coupled to the translating member such that the biasing member is configured to deploy the tow hook; and
   a pin configured to maintain the tow hook in a deployed position and to be in confronting relation with a bumper bracket of the vehicle.

2. The tow hook assembly of claim 1, wherein the tow hook is at least one of a carabiner hook, rope hook or other fastening, coupling, connecting or anchoring device that fastens, couples or connects to a towed object to the vehicle.

3. The tow hook assembly of claim 1, wherein the translating member includes a first end and a second end opposite the first end, the first end of the translating member configured to couple to the proximal end of the tow hook.

4. The tow hook assembly of claim 3, wherein the translating member includes an anchor disposed on the second end.

5. The tow hook assembly of claim 4, wherein the anchor is disposed within the housing such that the anchor is configured to secure the translating member within the housing.

6. The tow hook assembly of claim 3, wherein the hinge is disposed between the first end of the translating member and the proximal end of the tow hook.

7. The tow hook assembly of claim 4, wherein the housing includes a first housing end, a second housing end opposite the first housing end, and an opening disposed on the first housing end.

8. The tow hook assembly of claim 7, wherein the biasing member is disposed within the housing between the anchor and the second housing end of the housing.

9. The tow hook assembly of claim 7, wherein the opening is configured to allow the translating member and the tow hook to move proximally and distally along the horizontal axis.

10. The tow hook assembly of claim 9, wherein the anchor is configured to be in confronting relation with an inside surface of the housing adjacent to the opening when the tow hook is in the deployed position such that the anchor is configured to prevent the translating member from being removed from the housing when the tow hook is moved distally.

11. The tow hook assembly of claim 1, wherein the hinge is a torsion spring.

12. The tow hook assembly of claim 1, wherein the housing is configured to be coupled to a frame of the vehicle.

13. The tow hook assembly of claim 1, wherein the biasing member is a spring configured to apply a biasing force onto the translating member in the distal direction of the horizontal axis.

14. A method for operating a tow hook assembly of a vehicle, the method comprising:
    providing the tow hook assembly in a deployed position;
    maintaining the tow hook in the deployed position using a pin, wherein the pin is configured to be in confronting relation with a bumper bracket of the vehicle in the deployed position;
    applying an external force to a tow hook of the tow hook assembly to move the tow hook along a horizontal axis; and
    rotating the tow hook from the deployed position to a stowed position.

15. The method of claim 14, further comprising applying a biasing force, by a biasing member, to the tow hook via a translating member such that the tow hook extends past a bumper panel in the deployed position, the biasing force being opposite the external force, and the external force being applied to the tow hook to move the tow hook from the deployed position to the stowed position.

16. The method of claim 15, further comprising shifting the tow hook and the translating member along the horizontal axis when the external force is applied to the tow hook.

17. The method of claim 14, further comprising rotating the tow hook about a hinge due to a preload of the hinge when the external force applies enough force to move the tow hook along the horizontal axis such that the pin clears the bumper bracket of the vehicle.

* * * * *